US006198600B1

(12) United States Patent
Kitao et al.

(10) Patent No.: US 6,198,600 B1
(45) Date of Patent: Mar. 6, 2001

(54) THIN FILM MAGNETIC HEAD AND MANUFACTURING METHOD THEREOF

(75) Inventors: Mitsuhiro Kitao; Hiroki Nakazawa; Keiichi Shibata; Monjiro Momoi; Noboru Yamanaka, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/327,447

(22) Filed: Jun. 8, 1999

(30) Foreign Application Priority Data

Jun. 10, 1998 (JP) .................................................. 10-162683

(51) Int. Cl.[7] ........................... G11B 21/21; G11B 17/32; G11B 5/60
(52) U.S. Cl. ...................................... 360/235.2; 360/236.5
(58) Field of Search .............................. 360/234.7, 234.9, 360/235.1, 235.7, 235.8, 235.2, 236.5

(56) References Cited

U.S. PATENT DOCUMENTS

| | | | |
|---|---|---|---|
| 5,386,400 | * | 1/1995 | Nakayama et al. ..................... 369/13 |
| 5,617,273 | * | 4/1997 | Carr et al. ............................. 360/103 |
| 5,903,969 | * | 5/1999 | Haga ................................. 29/603.18 |
| 5,986,851 | * | 11/1999 | Angelo et al. ........................ 360/103 |
| 6,038,101 | * | 3/2000 | Yoda et al. ........................... 360/103 |
| 6,040,965 | * | 3/2000 | Terunuma et al. ..................... 360/122 |

FOREIGN PATENT DOCUMENTS 7-230615 * 8/1995 (JP) .

OTHER PUBLICATIONS

Hisashi Takano, et al. "Submicron–trackwidth Inductive/MR Composite Head," IEEE Transactions on Magnetics, vol. 27, No. 6, Nov. 1991, pp. 4678–4683.

K. Fukuda, et al. "Off–track Capability of a Pole Trimmed Thin Film Head," IEEE Transactions on Magnetics, vol. 30, No. 6, Nov. 1994, pp. 3891–3893.

* cited by examiner

*Primary Examiner*—William Klimowicz
(74) *Attorney, Agent, or Firm*—Oblon, Spivak, McClelland, Maier & Neustadt, P.C.

(57) ABSTRACT

The present invention is directed to a thin film magnetic head and its manufacturing method. A slider 1 is provided with base body surfaces 13 and 14 at its surface facing opposite a medium. An inductive thin film magnetic transducer 2 is provided with a first pole tip P1 and a second pole tip P2 whose front ends emerge at the base body surfaces 13 and 14 and indented portions 4 and 5 provided at the base body surfaces 13 and 14. A protective film 10 covers the base body surfaces 13 and 14 and indented portions 4 and 5. The thickness of the protective film 10 at the indented portions 4 and 5 is larger than the thickness at the base body surfaces 13 and 14. The magnetic films constituting the pole tips P1 and P2 can thus be reliably protected from oxidation, corrosion and the like, while minimizing the spacing loss.

20 Claims, 7 Drawing Sheets

THIN FILM MAGNETIC HEAD AND MANUFACTURING METHOD THEREOF

BACKGROUND OF THE INVENTION

1. Field of the Invention

The present invention relates to a thin film magnetic head employed in a magnetic recording/reproduction apparatus such as a magnetic disk apparatus, and a manufacturing method thereof.

2. Discussion of Background

In order to assure high density recording in magnetic disk apparatuses, the recording track width of thin film magnetic heads has been reduced to 1.0 μm or less in recent years. One of the prior art methods to achieve such a small recording track width is to machine the air bearing surface (ABS) of the slider. Indented portions having a specific depth are obtained by polishing the surface of the slider facing opposite the medium, defining a pattern by removing the area that contains the end surface of the magnetic film through the Focused Ion Beam (FIB) etching technique or through photolithography, and machining the air bearing surface in conformance with the pattern thus defined by employing a means such as ion milling.

IEEE Transactions on Magnetics Vol. 27, No. 6, November 1991, for instance, discloses a reduced track width obtained by applying the FIB etching technique on the ABS of the slider, and IEEE Transactions on Magnetics Vol. 30, No. 6, November 1994 discloses a thin film magnetic head having a reduced track width obtained by machining the slider through photolithography.

During the machining processes described above, the end surface of the magnetic film constituting the pole tip becomes exposed within the indented portions. As a means for protecting this end surface from oxidation or corrosion, a single protective film is formed over the entire surface facing opposite the medium including the ABS and the indented portions. Normally, the protective film is constituted of diamond-like carbon (DLC).

However, since the protective film has a consistent thickness and is formed onto the ABS as well as inside the indented portions, this structure poses a problem in that in order to cover the entire end surface of the magnetic film exposed within the indented portions, it is necessary to use a rather thick protective film. This means that the protective film formed onto the air bearing surface is thick as well, causing spacing loss which in turn leads to deteriorated electromagnetic conversion characteristics.

The problem described above occurs whenever an area containing a pole tip is removed and thus, it is not limited to the process performed to achieve a reduction in the track width.

SUMMARY OF THE INVENTION

It is an object of the present invention to provide a thin film magnetic head in which the end surface of the magnetic film constituting a pole tip is reliably protected from oxidation, corrosion and the like while achieving a reduction in spacing loss.

It is a further object of the present invention to provide a suitable method for manufacturing the thin film magnetic head described above.

In order to achieve these objects, the thin film magnetic head according to the present invention comprises a slider, at least one inductive thin film magnetic transducer and a protective film. The slider having a base body surface facing opposite a medium, is provided with indented portions recessed from the surface facing opposite the medium.

The inductive thin film magnetic transducer has a pole tip of which the front end emerges at the base body surface and the indented portions.

The protective film covers the base body surface as well as the indented portions. The thickness of the protective film at the indented portions is larger than the thickness of the protective film at the base body surface.

As described above, in the thin film magnetic head according to the present invention, the inductive thin film magnetic transducer is provided with a pole tip whose front end emerges at the base body surface and the indented portions. By adopting this structure, electromagnetic conversion characteristics corresponding to the extent of the indentation of the pole tip imparted by the indented portions are realized. A typical objective to remove an area of the base body surface where a pole tip is situated, is to achieve a reduction in the track width. In this case, since the width of the pole tip in the direction of the tracks that intersects the direction in which the medium travels, is reduced by the formation of indented portions, a flying type thin film magnetic head having a track width that is reduced in correspondence to the extent of the indentation of the area where the pole tip is situated, is achieved.

The protective film is formed onto the base body surface. As a result, the front end of the magnetic film constituting the pole tip being exposed inside the indented portions is covered by the protective film so that the front end of the magnetic film is protected from oxidation and corrosion.

The film thickness of the protective film at the indented portions is set larger than the film thickness of the protective film at the base body surface. In other words, the film thickness of the protective film formed onto the base body surface is smaller than the film thickness of the protective film formed inside the indented portions. Thus, with the protective film covering the base body surface being thinner, the spacing loss can be reduced, while at the same time covering the front end of the magnetic film which constitutes the pole tip with the protective film.

BRIEF DESCRIPTION OF THE DRAWINGS

Other objects, structural features and advantages of the present invention are explained in further detail in reference to the attached drawings illustrating the embodiments, wherein.

DETAILED DESCRIPTION OF THE PREFERRED EMBODIMENTS

Figure 1:
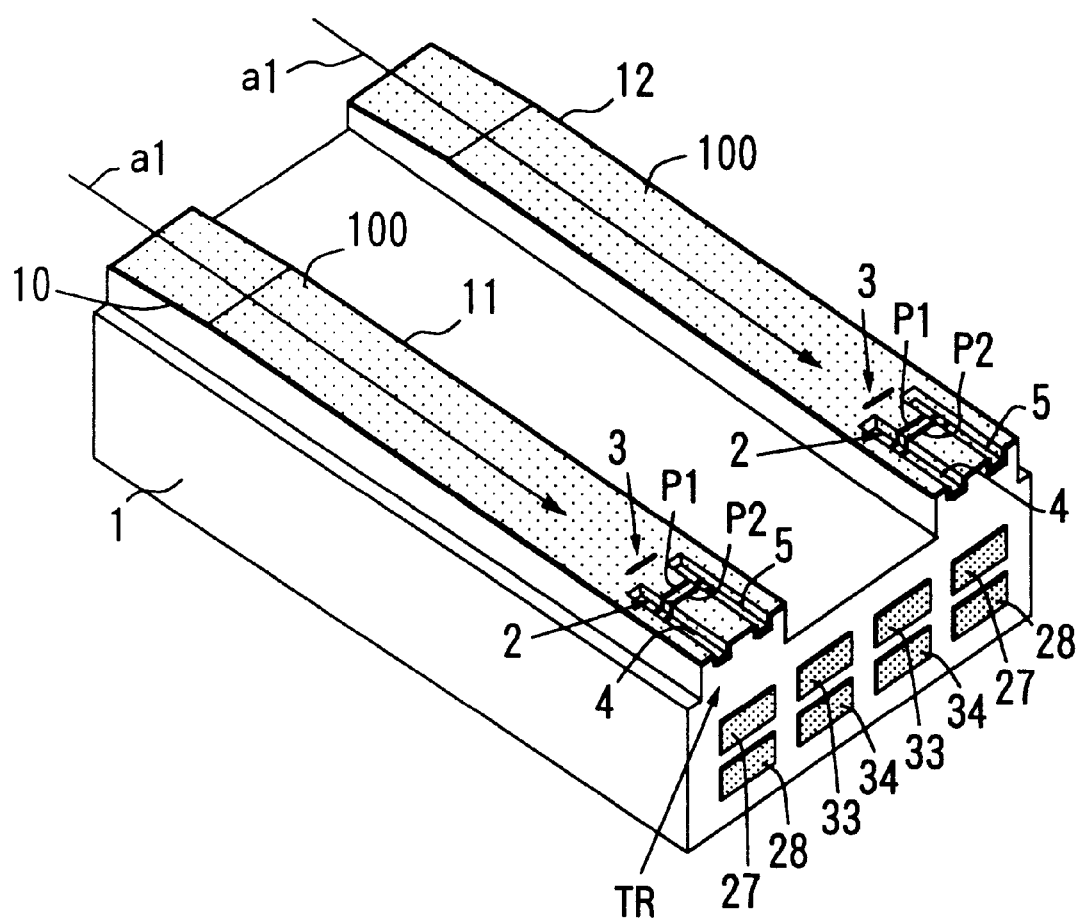
FIG. 1 is a perspective of the thin film magnetic head according to the present invention.
Figure 2:
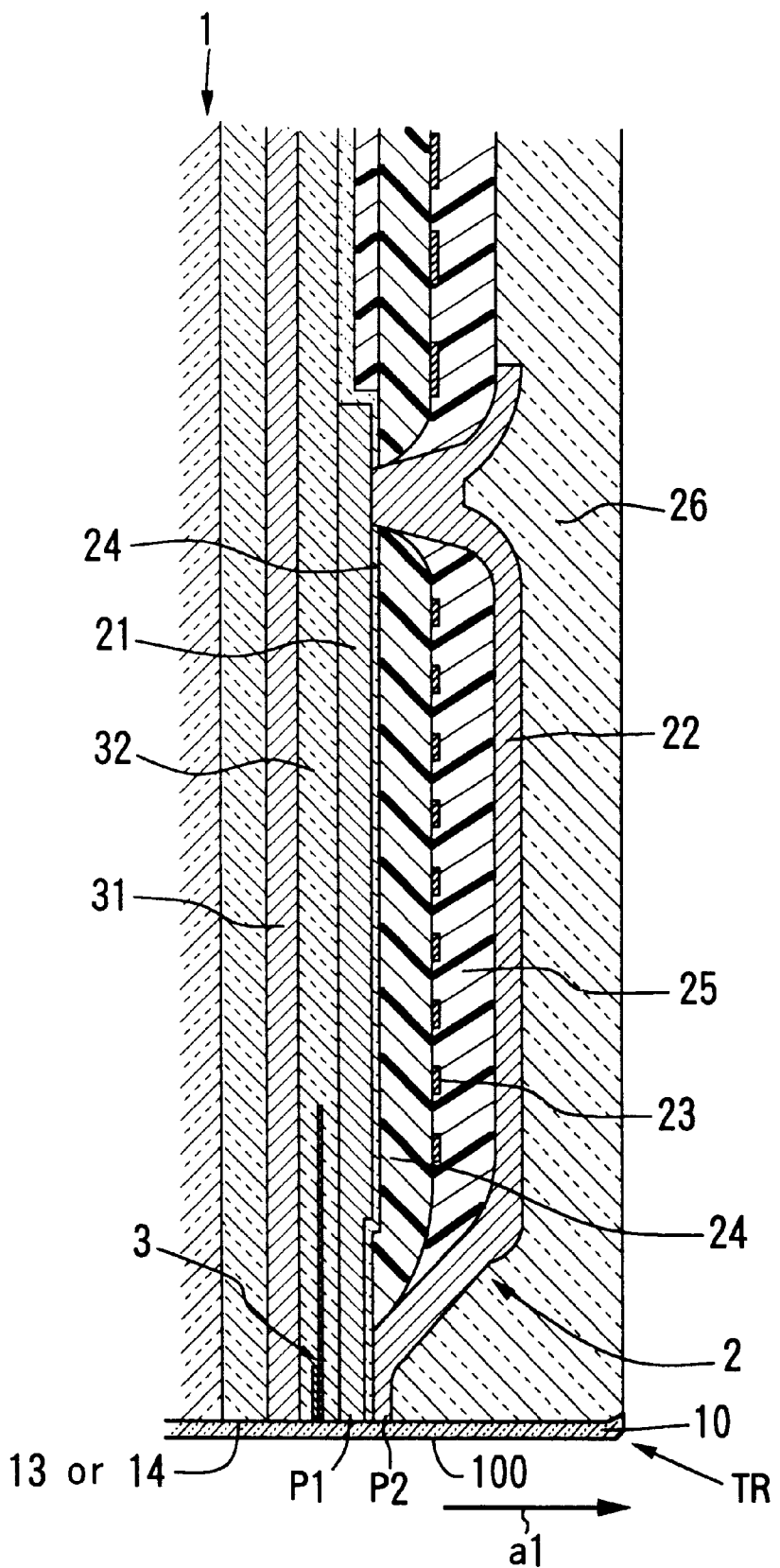
FIG. 2 is a sectional view of the thin film magnetic head illustrated in FIG. 1.
Figure 3:
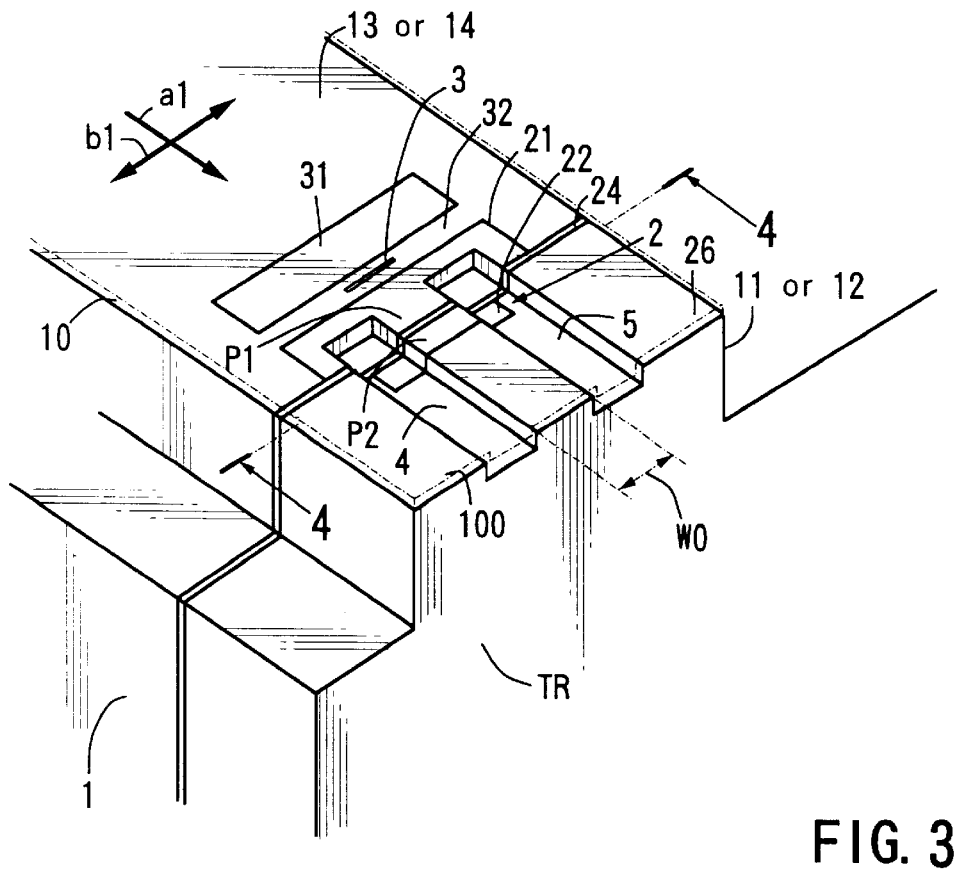
FIG. 3 is a perspective of the thin film magnetic head illustrated in FIGS. 1 and 2 in a partial enlargement.
Figure 4:
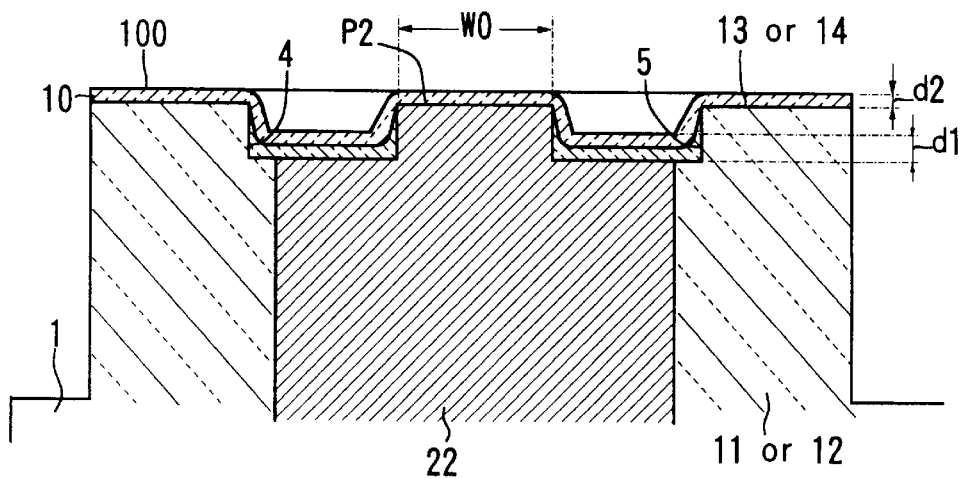
FIG. 4 is a sectional view taken along line 4—4 of FIG. 3.

Referring to FIGS. 1 to 4 in which dimensions are exaggerated, the thin film magnetic head according to the present invention includes a slider 1, at least one inductive thin film magnetic transducer 2 and a protective film 10.

The slider 1 is provided with rail portions 11 and 12 at a base body surface, with surfaces 13 and 14 of the rail portions 11 and 12 respectively being air bearing surfaces. The number of rail portions 11 and 12 is not restricted to two. For instance, the slider 1 may be provided with only 1, or more than 2 rail portions, or may even constitute a flat surface having no rail portion. In addition, the base body surface may take on various geometric shapes to improve flying characteristics and the like. The present invention may be adopted in combination with any of these types of sliders.

The inductive thin film magnetic transducer 2 situated at the trailing edge TR of the slider 1 is provided with a first pole tip P1 and a second pole tip P2. The front ends of the first pole tip P1 and the second pole tip P2 emerge at the surface 13 or 14 facing opposite the medium. The first pole tip P1 and the second pole tip P2 of the inductive thin film magnetic transducer 2 are exposed inside the indented portions 4 and 5. The depth, width, shape and the like of the indented portions 4 and 5 are varied in correspondence to the functions to be satisfied by the indented portions 4 and 5.

In the embodiment, the indented portions 4 and 5 are provided on two sides along the track direction b1, delimiting the first pole tip P1 and the second pole tip P2. Thus, the width W0 of the first pole tip P1 and the second pole tip P2 in the track direction b1 intersecting the direction a1 in which the medium travels is defined by the indented portions 4 and 5 provided at the surface 13 or 14 facing opposite the medium. In the embodiment, the indented portions 4 and 5 are used to define the width W0 of the pole tip P2 in the track direction b1. The indented portions 4 and 5 are formed to achieve a depth of 0.5 to 1.0 $\mu$m and a width of 30 to 100 $\mu$m, for instance.

The surfaces 100 of the protective film 10 formed onto the surfaces 13 and 14 are utilized as air bearing surfaces. The film thickness d1 of the protective film 10 at the indented portions 4 and 5 is set larger than the film thickness d2 of the protective film 10 at the surfaces 13 and 14 facing opposite the medium. The film thickness d1 of the protective film 10 at the indented portions 4 and 5 is measured from the bottom surfaces of the indented portions 4 and 5 to the superficial surface of the protective film 10. The film thickness d2 of the protective film 10 at the surfaces 13 and 14 is measured from the surfaces 13 and 14 facing opposite the medium to the surface 100 of the protective film 10. For instance, the film thickness d1 of the protective film 10 formed inside the indented portions 4 and 5 may be set within a range of approximately 16 to 18 nm or to a value exceeding this range, and the film thickness d2 of the protective film 10 formed onto the surfaces 13 and 14 may be set within the range of approximately 6 to 8 nm. Since the indented portions 4 and 5 are formed to achieve a depth of 0.5 to 1.0 $\mu$m and a width of 30 to 100 $\mu$m, the thickness d1 of the protective film 10 formed inside the indented portions 4 and 5 is extremely small relative to the depth of the indented portions 4 and 5. In the figures, the thicknesses d1 and d2 of the protective film 10 are illustrated in an exaggerated manner.

As explained above, in the thin film magnetic head according to the present invention, the inductive thin film magnetic transducer 2 includes the first pole tip P1 and the second pole tip P2 whose front ends emerge at the surfaces 13 and 14 and the indented portions 4 and 5. This structure realizes electromagnetic conversion characteristics that correspond to the extent of the indentation of the first pole tip P1 and the second pole tip P2 effected by the indented portions 4 and 5 and the resulting shape, depth, width and the like of the first pole tip P1 and the second pole tip P2.

In the embodiment, the indented portions 4 and 5 are provided on two sides along the track direction b1, delimiting the first pole tip P1 and the second pole tip P2. The width W0 of the first pole tip P1 and the second pole tip P2 in the track direction b1 intersecting the direction a1 in which the medium travels, is essentially defined by the indented portions 4 and 5 formed onto the surfaces 13 and 14 facing opposite the medium. By adopting this structure, a flying type thin film magnetic head having a recording track width W0 which is reduced in correspondence to the extent of indentation is achieved.

The protective film 10 covers the surface of the slider 1 facing opposite the medium. Consequently, the first pole tip P1 and the second pole tip P2 being exposed inside the indented portions 4 and 5 are covered by the protective film 10 so as to prevent oxidation and corrosion. Since the protective film 10 is also formed onto the surfaces 13 and 14 of the slider 1, the surfaces 100 of the protective film 10 function as air bearing surfaces.

The film thickness d1 of the protective film 10 formed inside the indented portions 4 and 5 is larger than the film thickness d2 of the protective film 10 formed onto the surfaces 13 and 14. In other words, the film thickness d2 of the protective film 10 at the surfaces 13 and 14 is smaller than the film thickness d1 of the protective film 10 at the indented portions 4 and 5. Thus, the first pole tip P1 and the second pole tip P2 exposed within the indented portions 4 and 5 are completely covered by the protective film 10 and at the same time, the film thickness d2 of the protective film 10 formed onto the surfaces 13 and 14 can be reduced to minimize the spacing loss. The protective film 10 is formed so as to achieve a film thickness d2 at the surfaces 13 and 14 equal to or less than 10 nm, e.g., approximately 6 to 8 nm. The protective film 10 may contain a DLC film or a nitride film. Furthermore, the protective film 10 may include a silicon film which may be employed as a base film for the DLC film.

Figure 5:
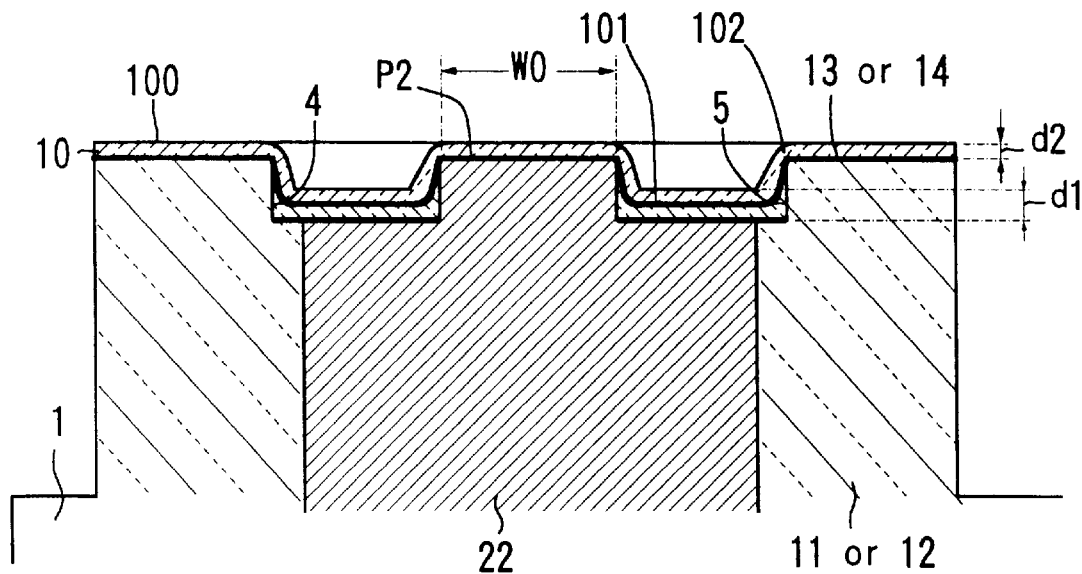
FIG. 5 is an enlarged sectional view of the thin film magnetic transducer in another embodiment of the thin film magnetic head according to the present invention.

Referring now to FIG. 5, the protective film 10 is constituted of a DLC film 102 having a film thickness of approximately 6 nm provided onto an Si film 101 having a film thickness of approximately 2 nm. The surfaces 13 and 14 are laminated once with this double-layered protective film 10 while the indented portions 4 and 5 are laminated twice or more with this double-layered protective film 10

The base film constituted of the Si film 101 increases the strength with which the protective film 10 is deposited onto the slider which is constituted of a ceramic structure such as $Al_2O_3TiC$.

The present invention may be adopted regardless of the shape of the indented portions 4 and 5. In addition, the planar shape of the protective film 10 is arbitrary and may be a flat surface, a textured surface or a surface with indentations and projections. Since the surfaces 100 of the protective film 10 constitute air bearing surfaces, the ABS characteristics can be controlled by selecting a specific surface form for them.

Referring again to FIGS. 1 to 4, the inductive thin film magnetic transducers 2 situated at the trailing edge TR of the slider 1 are each provided with a first magnetic film 21, a second magnetic film 22, a coil film 23, a gap film 24, an insulating film 25 and a protective film 26. The gap film 24 and the protective film 26 are constituted of alumina or the like and the insulating film 25 is constituted of an organic resin. The end surfaces of the first magnetic film 21 and the second magnetic film 22 constitute a first pole tip P1 and a second pole tip P2 respectively, facing opposite each other over the gap film 24 having an extremely small thickness. Write is performed at the first pole tip P1 and the second pole tip P2. The yokes of the first magnetic film 21 and the second magnetic film 22 are linked with each other to complete a magnetic circuit at a back gap area located on the side opposite from the side where the first pole tip P1 and the second pole tip P2 are provided. The coil film 23 is formed in a spiral shape around the area where the yokes are linked to the insulating film 25. The two ends of the coil film 23 are made electrically continuous with bumps 27 and 28 (see FIG. 1). The number of turns and the number of layers of the coil film 23 are arbitrary.

According to the present invention, the thin film magnetic transducers 2 are situated within the area where the indented portions 4 and 5 are provided and is an inductive transducer. The inductive thin film magnetic transducers 2 may be utilized for both write and read operations in magnetic recording/reproduction. Alternatively, the inductive thin film magnetic transducers 2 may be employed exclusively for write operations, and separate thin film magnetic transducers that use the magnetoresistance effect (hereafter referred to as MR elements) may be provided for read operations.

In the embodiment, the inductive magnetic transducers 2 are employed exclusively for write operations and the MR elements 3 are provided for read operations. The MR elements 3 may adopt any of the various film structures that have been proposed and put into practical use to date. These film structures include one employing anisotropic MR elements constituted of permalloy or the like and those using a giant magnetoresistive (GMR) film. The present invention may be adopted in combination with any of these various types of MR elements. The MR elements 3 are each provided between a first shield film 31 and the first magnetic film 21 which also functions as a second shield film, inside an insulating film 32. The insulating film 32 is constituted of alumina or the like. Each of the MR elements 3 is connected to bumps 33 and 34 (see FIG. 1).

The thin film magnetic transducers 2 and 3 positioned at the trailing edge TR of the slider 1 are provided at either one of the rail portions 11 and 12 or at both of them. The medium traveling direction a1 matches the direction in which air flows out when the medium travels at high speed. Bumps 27 and 28 connected to the thin film magnetic transducers 2 and bumps 33 and 34 connected to the MR elements 3 are provided at an end surface of the slider 1.

Figure 6:
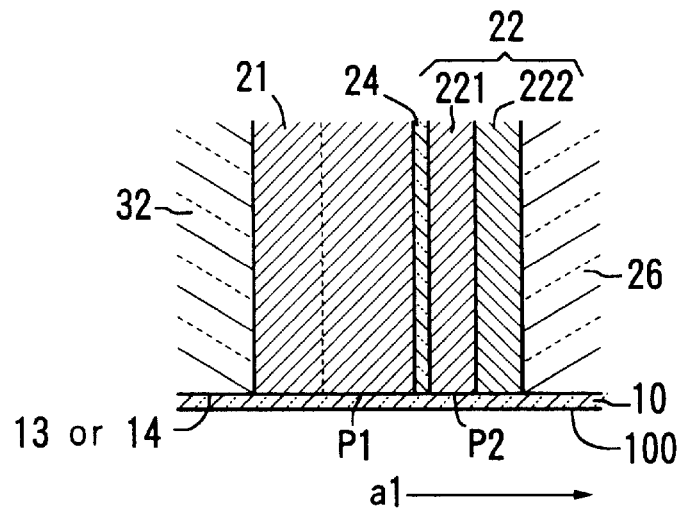
FIG. 6 is an enlarged sectional view of the thin film magnetic transducer in another embodiment of the thin film magnetic head according to the present invention.

Referring to FIG. 6 wherein the same reference numbers are assigned to components identical to those illustrated in FIGS. 1 to 5, while the indented portions 4 and 5 are not illustrated, their structure and shape are identical to those in the embodiment illustrated in FIGS. 1 to 5. Of the first magnetic film 21 and the second magnetic film 22, the second magnetic film 22 includes a third magnetic layer 221 that is in contact with a gap film 24 at the pole tip P2 and a fourth magnetic layer 222 that is deposited in contact with the third magnetic layer 221 (to the right in FIG. 6). By adopting this structure, the material characteristics of the third magnetic layer can be differentiated from the material characteristics of the fourth magnetic layer to achieve required improvements in the characteristics.

For instance, the saturation magnetic flux density of the third magnetic layer 221 may be selected at a value larger than that representing the saturation magnetic flux density of the fourth magnetic layer 222. By making such a selection, the high frequency recording characteristics can be improved. As a specific example in which the saturation magnetic flux density of the third magnetic layer 221 is selected at a value larger than that representing the saturation magnetic flux density of the fourth magnetic layer 222, a combination of a fourth magnetic layer 222 constituted of a Ni (80%)—Fe (20%) permalloy and a third magnetic layer 221 constituted of a Ni (50%)—Fe (50%) permalloy may be adopted. The third magnetic film 221 having the composition described above becomes corroded more readily compared to the fourth magnetic film 221 having the composition described above, and thus, it is concluded that the protective film structure according to the present invention is extremely effective.

As another effective means for improving the high frequency recording characteristics, the resistivity of the third magnetic layer 221 may be set larger than the resistivity of the fourth magnetic layer 222.

It is also effective to set the abrasion resistance of the third magnetic layer 221 higher than the abrasion resistance of the fourth magnetic layer 222. In this case, the abrasion of the third magnetic layer 221 that is provided adjacent to the gap film 24 and practically defines the gap thickness can be avoided to achieve stable electromagnetic conversion characteristics. Although a detailed explanation is omitted, a similar structure may be adopted in the first magnetic film 21, as well.

In addition, the structure of the pole tips in the thin film magnetic head is not restricted to that in the embodiments shown, and any of various pole structures that have been proposed to date or that will be proposed in the future may be adopted. For instance, the present invention may be adopted in combination with pole tips each adopting a multilayer film structure having two or more layers or in combination with only one of the two pole tips adopting a multilayer film structure. Furthermore, when a pole tip adopts a multilayer film structure, a portion of the magnetic film constituting the pole tip may be formed at a position receded from the surface facing opposite the medium so that it is not exposed at the base body surface. Moreover, miniaturization of the thin film magnetic head may be achieved by adopting a structure in which an indented portion is provided at one surface of the base body and in which the essential portion of an inductive thin film magnetic transducer including the coil portion is positioned inside the indented portion.

Next, in reference to FIGS. 7 to 15, the method for manufacturing the thin film magnetic head according to the present invention is explained.

Figure 7:
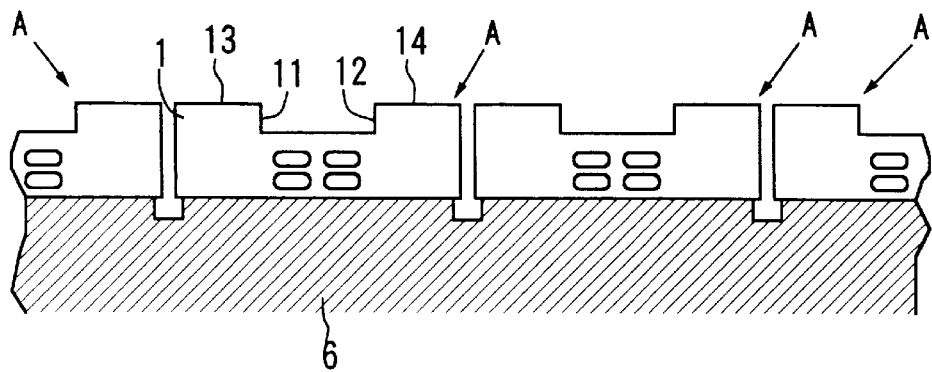
FIG. 7 illustrates a step included in the method for manufacturing the thin film magnetic head according to the present invention.

First, as illustrated in FIG. 7, a large number of thin film magnetic heads A are arrayed on a jig 6, each secured at one surface by a means such as bonding. The thin film magnetic heads A each have undergone the grinding process performed on the rails 11 and 12 and the polishing process performed on the surfaces 13 and 14 and thus, achieve a required gap depth. Although not shown, the array of individual thin film magnetic heads A illustrated in FIG. 7 is achieved by cutting a bar of alligned thin film magnetic heads after mounting the bar onto the jig 6.

Figure 8:
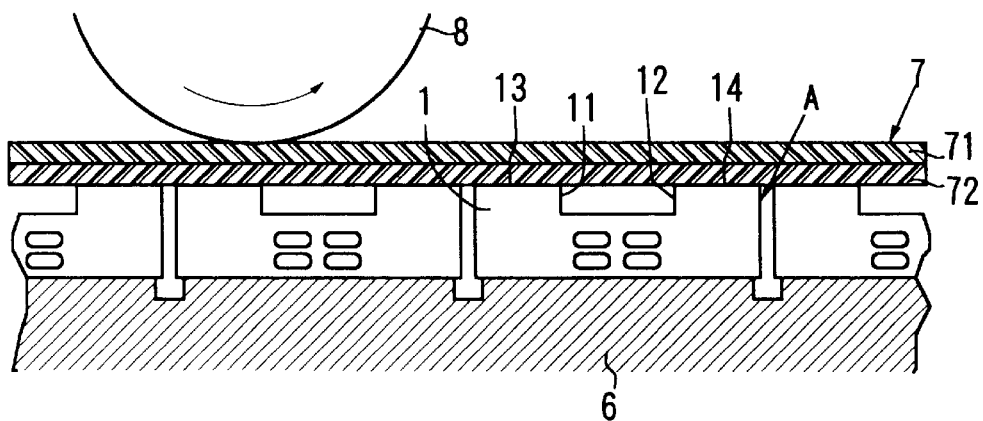
FIG. 8 illustrates a step following the step illustrated in FIG. 7.
Figure 9:
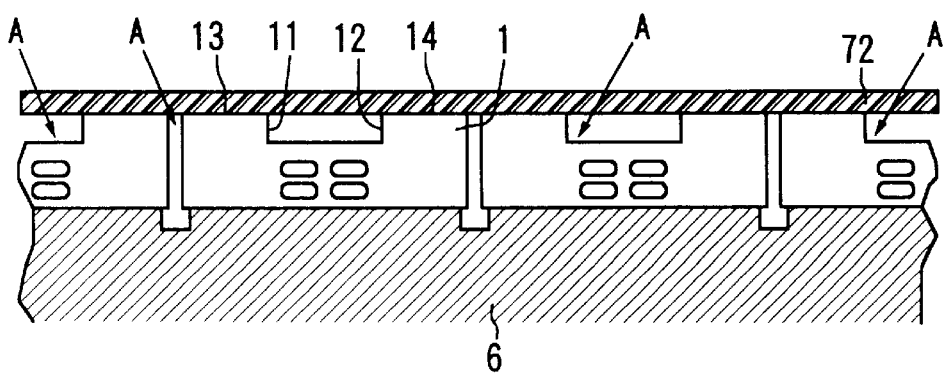
FIG. 9 illustrates a step following the step illustrated in FIG. 8.

Next, as illustrated in FIG. 8, a resist film 7 constituted of an organic resist film 72 formed onto a support body 71 is laminated onto the surfaces 13 and 14 to transfer the resist film 72.

Following the step described above, as illustrated in FIG. 9, the support body 71 is removed. The support body 71 is constituted of a flexible film such as polyethylene terephthalate. The resist film 72 is normally constituted by using a photosensitive resist, which may be either a negative type or a positive type photosensitive resist. In the embodiment, a positive type photosensitive resist is used. The positive type photosensitive resist may be, for instance, the product PFR3004 (manufactured by Nippon Synthetic Rubber Co. Ltd.). At the resist film 7, the resist film 72 is formed through spin coating. The film thickness of the resist film 72 is set at a consistent thickness that allows for the processing of the surfaces 13 and 14. The transfer may be achieved through thermal compression bonding employing a hot roll 8 (see FIG. 8).

Figure 10:
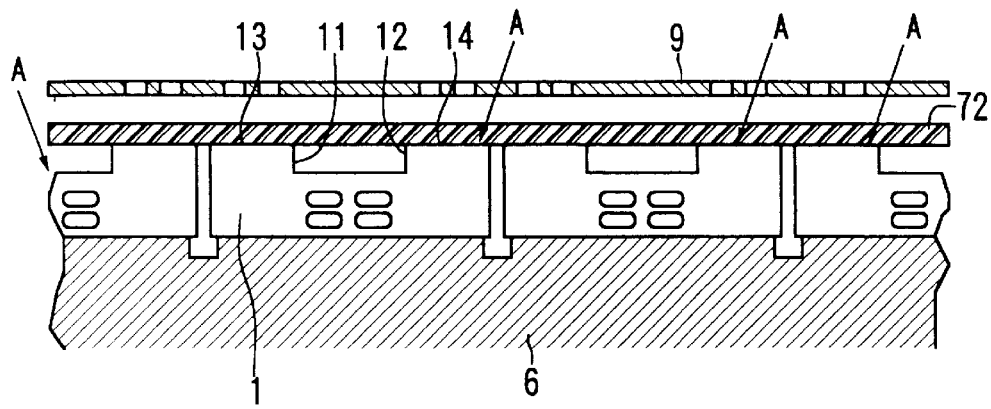
FIG. 10 illustrates a step following the step illustrated in FIG. 9.
Figure 11:
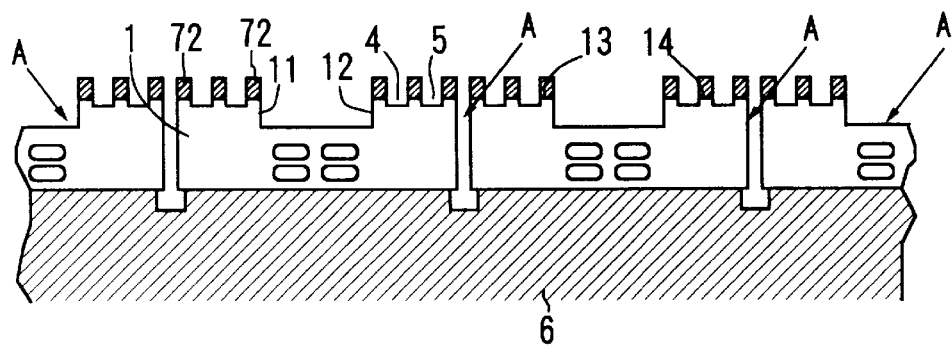
FIG. 11 illustrates a step following the step illustrated in FIG. 10.

After transferring the resist film 72 onto the surfaces 13 and 14, it is exposed and developed using a mask 9 having a pattern required for forming indented portions, as illustrated in FIG. 10. Since the resist film 72 is constituted using a positive type photosensitive resist in the embodiment, the exposed areas are removed during the developing process. The developing process is achieved by etching the exposed portions with an alkaline developing solution. Subsequently, processing such as ion milling, chemical etching or the like is performed on the surfaces 13 and 14 over the resist film 72 that has remained in place during the patterning process. Consequently, as illustrated in FIG. 11, the indented portions 4 and 5 achieving a specific pattern and a specific depth are obtained.

Figure 12:
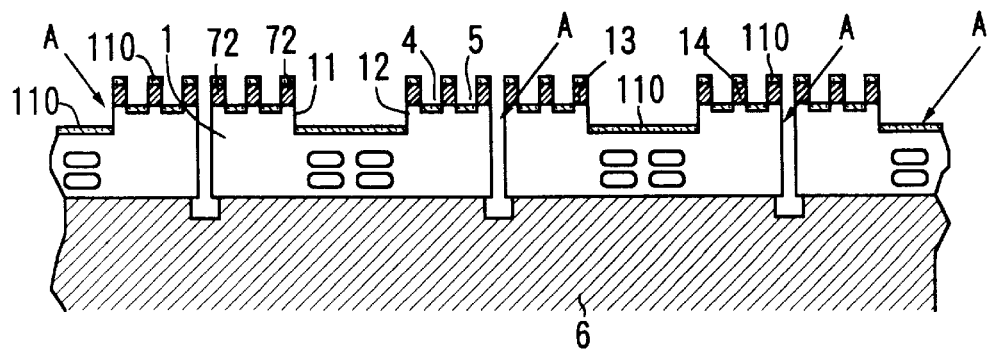
FIG. 12 illustrates a step following the step illustrated in FIG. 11.

Next, as illustrated in FIG. 12, without removing the resist film 72, a first protective film 110 is formed onto the resist film 72. The first protective film 110 is formed onto the surface of the slider 1 including the insides of the indented portions 4 and 5, but not onto the surfaces 13 and 14 that are covered by the resist film 72. The first protective film 110 may be formed through, for instance, sputtering. The first protective film 110 is formed to achieve a film thickness of, for instance, 10 nm or larger.

Figure 13:
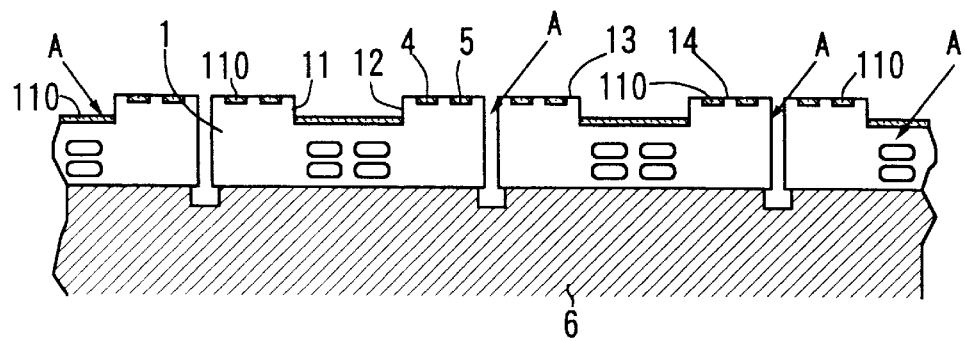
FIG. 13 illustrates a step following the step illustrated in FIG. 12.

Next, as illustrated in FIG. 13, the resist film 72 is removed. The first protective film 110 deposited onto the resist film 72 is removed together with the resist film 72.

Figure 14:
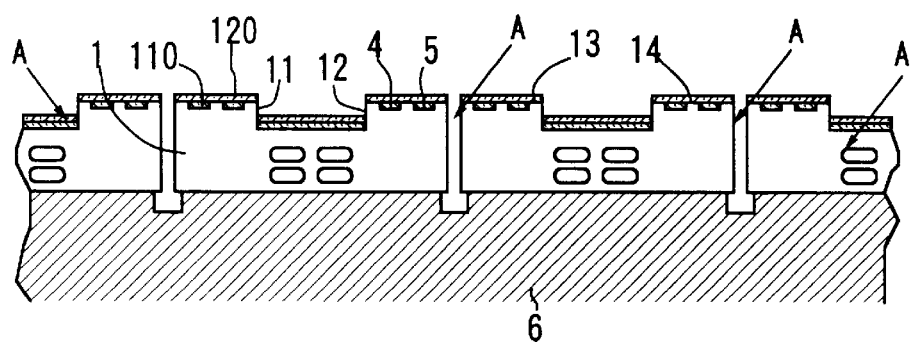
FIG. 14 illustrates a step following the step illustrated in FIG. 13.
Figure 15:
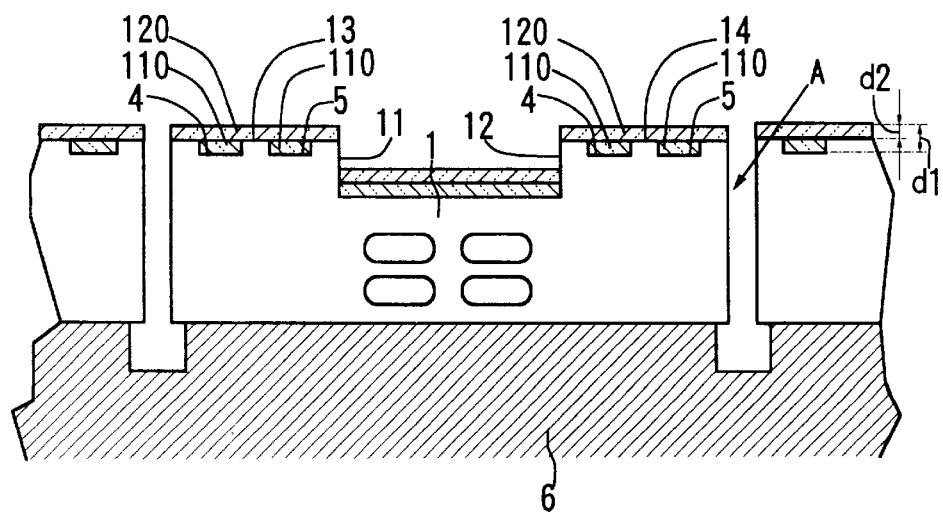
FIG. 15 is a partial enlargement of FIG. 14.

In the following step, as illustrated in FIG. 14, a second protective film 120 is formed through sputtering or the like over the entire surface of the slider 1 that faces opposite a medium. The second protective film 120 is formed to achieve a film thickness of, for instance, approximately 6 to 8 nm. Since the first protective film 110 has already been formed inside the indented portions 4 and 5, the film thickness d1 of the protective film 10 formed inside the indented portions 4 and 5 is the sum of the film thickness of the first protective film 110 formed through the first lamination and the film thickness d2 of the second protective film 120 formed through the second lamination as illustrated in FIG. 15. The film thickness of the protective film 10 formed onto the surfaces 13 and 14 at the slider 1 is only made up of the film thickness d2 of the second protective film 120 formed through the second lamination. As a result, the film thickness d1 of the protective film 10 formed inside the indented portions 4 and 5 is bound to be larger than the film thickness d2 of the protective film 10 formed onto the surfaces 13 and 14.

The method adopted in the embodiment described above is characterized by the two-stage process in which the first protective film 110 is first formed onto the surface of the slider 1 facing opposite a medium and inside the indented portions 4 and 5 and then the second protective film 120 is formed onto the surfaces 13 and 14 and for a second time inside the indented portions 4 and 5.

Alternatively, the order of the formation of the first protective film and the second protective film may be reversed. In this two-stage process a first protective film 110 is formed onto the surfaces 13 and 14 as well as inside the indented portions 4 and 5, after which a second protective film 120 is formed onto the first protective film 110 where the indented portions 4 and 5 are situated.

While the explanation is given on an example in which the resist film 7 constituted by forming the organic resist film 72 on the support body 71 in reference to the embodiment, a spin-coat method or the like may be adopted instead. In addition, while the explanation is given using an example in which the pattern is formed using a photoresist, another high precision pattern formation technology such as the Focused Ion Beam (FIB) machining technology may be adopted instead.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The present application is based on Japanese priority application number 10-162683, filed with the Japanese Patent Office on Jun. 10, 1998, the entire contents of which are hereby incorporated by reference.

What is claimed is:

1. A thin film magnetic head comprising:
    a slider having a base body surface facing opposite a medium, said base body surface being provided with indented portions;
    at least one inductive thin film magnetic transducer having a pole tip of which a front end emerges at said base body surface and said indented portions, delimiting said pole tip; and
    a protective film covering said indented portions and said base body surface, with the thickness of said protective film at said indented portions being larger than the thickness at said base body surface.
2. The thin film magnetic head of claim 1, wherein:
    said indented portions define a track width of said pole tip.
3. The thin film magnetic head of claim 1, wherein:
    said protective film includes a diamond-like carbon film.
4. The thin film magnetic head of claim 3, wherein:
    said protective film includes a silicon film being a base film of said diamond-like carbon film.
5. The thin film magnetic head of claim 1, wherein:
    said protective film includes a nitride film.

6. The thin film magnetic head of claim 1, wherein:

said indented portions are provided on two sides of said pole tip, delimiting said pole tip along the direction of data tracks.

7. The thin film magnetic head of claim 1, wherein:

said pole tip includes a first pole tip and a second pole tip facing opposite each other via a gap film; and said indented portions essentially define the width of at least either said first pole tip or said second pole tip in the direction of data tracks.

8. The thin film magnetic head of claim 7, wherein:

the width of said first pole tip in the direction of the tracks is essentially defined by said indented portions.

9. The thin film magnetic head of claim 7, wherein:

widths of said first pole tip and said second pole tip in the direction of the tracks are essentially defined by said indented portions.

10. The thin film magnetic head of claim 7, wherein:

at least either said first pole tip or said second pole tip includes two magnetic films having different material characteristics from each other and are provided adjacent to each other.

11. The thin film magnetic head of claim 10, wherein:

of said two magnetic films, a magnetic film adjacent to a gap film has a saturation magnetic flux density larger than the saturation magnetic flux density of the other magnetic film.

12. The thin film magnetic head of claim 10, wherein:

the magnetic film adjacent to a gap film has a resistivity higher than the resistivity of the other magnetic film.

13. The thin film magnetic head of claim 10, wherein:

the abrasion resistance of the magnetic film adjacent to a gap film is better than the abrasion resistance of the other magnetic film.

14. The thin film magnetic head of claim 10, having a thin film magnetic transducer utilizing the magnetoresistance effect.

15. A method for manufacturing a thin film magnetic head, said thin film magnetic head comprising:

a slider having a base body surface facing opposite a medium, said base body surface being provided with indented portions;

at least one inductive thin film magnetic transducer having a pole tip of which a front end emerges at said base body surface and said indented portions; and a protective film covering said indented portions and said base body surface, with the thickness of said protective film at said indented portions being larger than the thickness at said base body surface;

said method comprising the steps of:

forming said indented portions on said base body surface;

forming a first protective film into said indented portions; and forming a second protective film onto said base body surface and said first protective film.

16. A method for manufacturing a thin film magnetic head, said thin film magnetic head comprising:

a slider having a base body surface facing opposite a medium, said base body surface being provided with indented portions;

at least one inductive thin film magnetic transducer having a pole tip of which a front end emerges at said base body surface and said indented portions; and a protective film covering said indented portions and said base body surface, with the thickness of said protective film at said indented portions being larger than the thickness at said base body surface;

said method comprising the steps of:

forming said indented portions on said base body surface;

forming a first protective film that covers said base body surface and the bottom surface of said indented portions;

forming a second protective film onto said first protective film where said indented portions are provided.

17. The method of claim 15, wherein:

said forming of said indented portions on said base body surface defines a track width of said pole tip.

18. The method of claim 16, wherein:

said forming of said indented portions on said base body surface defines a track width of said pole tip.

19. The method of claim 15, wherein:

said forming of said indented portions includes forming said indented portions on two sides of said pole tip to define a track width of said pole tip.

20. The method of claim 16, wherein:

said forming of said indented portions includes forming said indented portions on two sides of said pole tip to define a track width of said pole tip.

* * * * *